US011112089B2

(12) United States Patent
Broughton et al.

(10) Patent No.: US 11,112,089 B2
(45) Date of Patent: Sep. 7, 2021

(54) TWO STAGE OPTIC FOR LED DEVICES

(71) Applicant: SIGNIFY HOLDING B.V., Eindhoven (NL)

(72) Inventors: Kevin C. Broughton, Sharpsburg, GA (US); Isaac P. Dost, Syracuse, NY (US)

(73) Assignee: SIGNIFY HOLDING B.V., Eindhoven (NL)

(*) Notice: Subject to any disclaimer, the term of this patent is extended or adjusted under 35 U.S.C. 154(b) by 147 days.

(21) Appl. No.: 16/456,445

(22) Filed: Jun. 28, 2019

(65) Prior Publication Data

US 2020/0408387 A1     Dec. 31, 2020

(51) Int. Cl.
| | |
|---|---|
| *F21V 13/04* | (2006.01) |
| *F21V 7/00* | (2006.01) |
| *F21V 7/06* | (2006.01) |
| *F21Y 115/10* | (2016.01) |

(52) U.S. Cl.
CPC ............ *F21V 13/04* (2013.01); *F21V 7/0091* (2013.01); *F21V 7/06* (2013.01); *F21Y 2115/10* (2016.08)

(58) Field of Classification Search
CPC .......... F21V 13/04; F21V 7/0091; F21V 7/06; F21Y 2115/10
See application file for complete search history.

(56) References Cited

U.S. PATENT DOCUMENTS

| | | | |
|---|---|---|---|
| 2003/0156417 A1 | 8/2003 | Gasquet | |
| 2012/0020082 A1* | 1/2012 | Shinohara | F21V 3/062 362/235 |
| 2014/0204587 A1 | 7/2014 | Hukkanen | |
| 2017/0038511 A1 | 2/2017 | Stormberg | |
| 2018/0143355 A1 | 5/2018 | Hu | |
| 2018/0216798 A1 | 8/2018 | Broughton | |

FOREIGN PATENT DOCUMENTS

DE        202017103188        8/2018

* cited by examiner

*Primary Examiner* — Anne M Hines

(57) ABSTRACT

A lighting module is disclosed. The lighting module includes a light emitting diode (LED) light source, and a total internal reflection (TIR) optical assembly. The optical assembly includes a refractor configured to be located proximate to the LED light source, and a reflector configured to be attached to the refractor. The refractor is made from a material that is resistant to thermal damage when exposed to heat generated by the LED light source.

25 Claims, 6 Drawing Sheets

TWO STAGE OPTIC FOR LED DEVICES

BACKGROUND

Light-emitting diodes (LEDs) are increasingly being utilized as light sources in various illumination devices. As with illumination devices based on other light sources (e.g., incandescent bulbs), lenses or other types of optics may be utilized to collect and direct the light from the LEDs. In certain instances, an optical device, such as a reflector, is disposed over or around one or more of the LEDs to control the light emitted from the respective LEDs and maximize light output from the illumination device in a desired light pattern. LEDs are positioned at a tail end of the reflector. To achieve better lighting efficiency, the reflector is configured to reflect light rays emanating from the LEDs and striking on the reflector body towards a predetermined direction, for example in a parallel forward direction as in the case of a parabolic reflector.

Generally, LEDs of an illumination device generate heat which may reduce the service life and performance of various components of the illumination device, including the reflector. Conventional heat dissipation technology for LED illumination devices utilizes heat dissipation structure (heat sink) disposed around LEDs to prevent heat from affecting the LED light. Typically, the reflector is manufactured using a metal coated plastic material which is susceptible to damage upon exposure to high temperatures produced in close proximity to the LEDs and/or even the heat sink of the illumination device. Furthermore, the heat sink may not be sufficient to prevent thermal damage to the reflector.

This document describes an optical assembly and methods of manufacturing thereof that are directed to solving the issues described above, and/or other problems.

SUMMARY

In one aspect, a lighting module may include a light emitting diode (LED) light source and a total internal reflection (TIR) optical assembly. The TIR optical assembly may include a refractor configured to be located proximate to the LED light source, and a reflector configured to be attached to the refractor. The refractor is made from a material that is resistant to thermal damage when exposed to heat generated by the LED light source.

Optionally, the material of the refractor may be silicone. Furthermore, the reflector may be formed from a metallic material to provide reflection properties.

In certain embodiments, the reflector may include a hollow body configured to form an upper part of the TIR optical assembly that is not proximate to the LED light source. Optionally, an inner surface of the hollow body may be configured to substantially reflect light rays received from the LED light source in a light distribution pattern away from the LED light source.

The refractor may include a solid body that forms a lower part of the TIR optical assembly. Optionally, the refractor may also include an inner surface that defines a cylindrical channel extending longitudinally through the refractor and configured to be positioned over the LED light source. In certain embodiments, the refractor may also include an upper surface that extends from a top of the inner surface to a top of an outer surface of the refractor, and that includes a plurality of corrugations. The inner surface of the refractor may be shorter than the outer surface of the refractor. Each corrugation may include two planar faces positioned at an angle with respect to each other. Optionally, the angle may be configured to provide TIR of light rays incident on the inner surface of the refractor. The plurality of corrugations may also be designed to provide a direct line of sight from the LED light source to the reflector.

A light ray received by the refractor from the LED light source may traverse a path within the solid body of the refractor and exit the refractor via one of the plurality of corrugations in the upper surface in a light distribution pattern away from the LED light source. In example embodiments, a light ray may enter the solid body of the refractor via the inner surface and form a refracted light ray which is then reflected by the outer surface of the refractor before exiting the refractor. The outer surface may be polished to provide reflection of incident light rays In certain embodiments, the TIR optical assembly may have a parabolic shape configured to provide an output light distribution pattern that is collimated and in a direction parallel to an axis of symmetry of the parabolic shape. The LED light source may be located proximate to the focus of the parabolic shape.

In one or more embodiment, the light emitted by the LED light source may be substantially collimated.

In another aspect, an optical assembly for a lighting module is disclosed. The optical assembly may include, a refractor configured to be located proximate to an LED light source, and a reflector configured to be attached to the refractor. The refractor may be made from a material that is resistant to thermal damage when exposed to heat generated by the LED light source. The optical assembly may be configured to provide total internal reflection (TIR) of light rays emitted by the LED light source.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

In this document, the terms "lighting device," "light fixture," "luminaire" and "illumination device" are used interchangeably to refer to a device that includes a source of optical radiation such as one or more light emitting diodes (LEDs), light bulbs, ultraviolet light or infrared sources, or other sources of optical radiation. A lighting device will also include a housing, one or more electrical components for conveying power from a power supply to the device's optical radiation source, and optionally control circuitry. An "LED luminaire" is a lighting device that includes LEDs as an optical radiation source. One or more lighting modules may be included in an illumination device.

Figure 1:
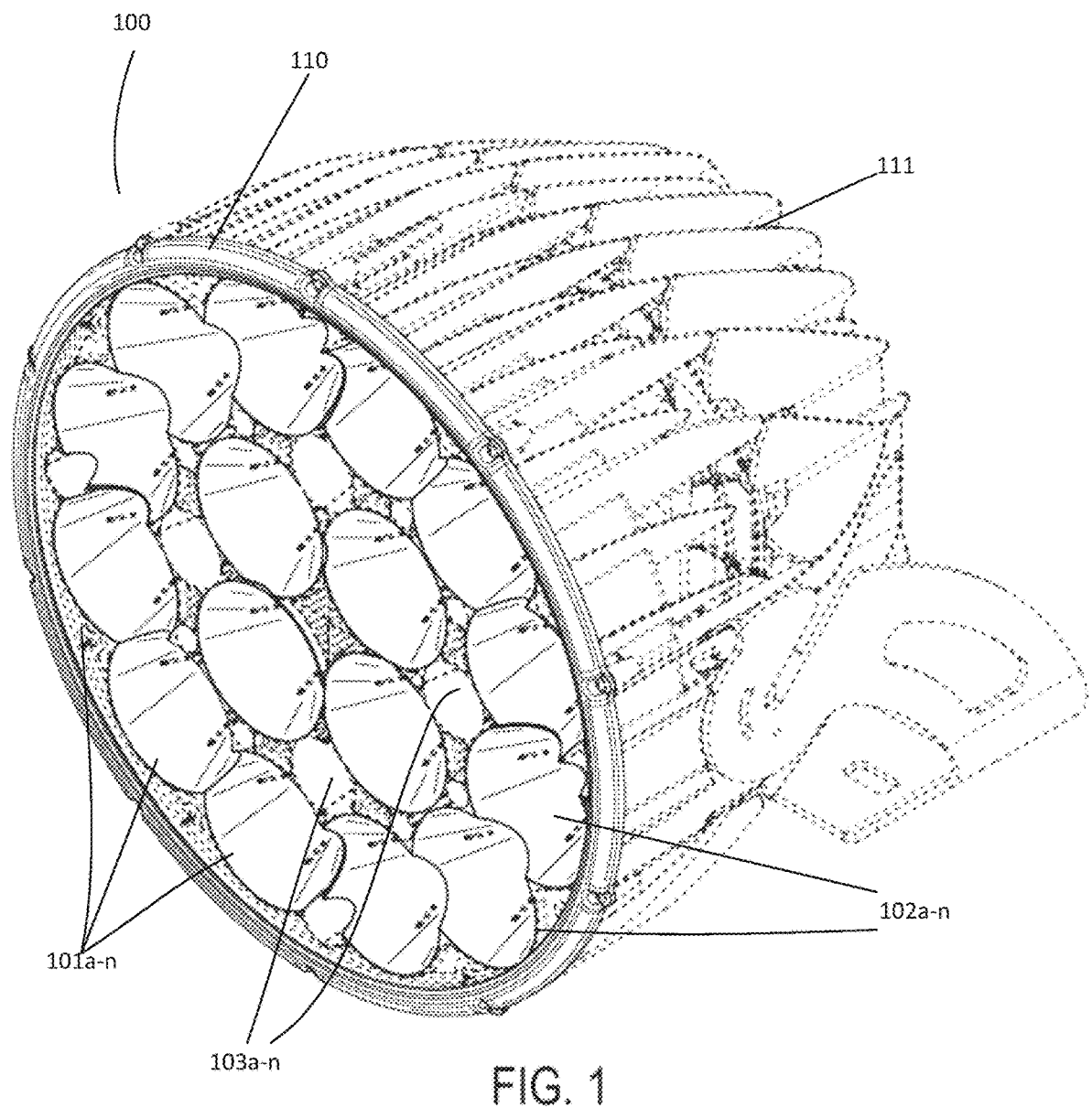
FIG. 1 illustrates a perspective view of an example illumination device.

FIG. 1 illustrates a perspective view of an illumination device 100 of the current disclosure. As shown in FIG. 1, the illumination device 100 may include a plurality of lighting modules 101a-n sufficient to provide a high intensity LED device. The illumination device 100 may include a housing 110 that holds electrical components such as a fixture controller, a power source, and wiring and circuitry to supply power and/or control signals to the LED modules. The housing may also include a heat sink 111 (e.g., a plurality of fins) configured to dissipate heat generated by the lighting module 101a-n.

Each of the lighting modules 101a-n may include an optical assembly 102a-n fitted over an LED light source 103a-n. Each lighting module 101a-n may be circular shaped as shown in FIG. 1. Although other shapes, such as or a square, diamond-shaped, oval, rectangle, or the like are within the scope of this disclosure.

The LED light source 103a-n of each lighting module 101a-n may include any number of LEDs (not shown here), such as one, two, three, four, five or more, sufficient to provide a required intensity lighting module, that may be positioned on a substrate. The LEDs of an LED light source may be arranged in an array or other configuration that are positioned to emit light away from the lighting module. The LEDs may be chip-on-board (COB) type LEDs, LED die, or any other type of LEDs known to those skilled in the art. The disclosure is not limited by the number, colors, or types of LEDs used and is applicable with any layout of any number of any type and any color of LEDs or Organic LEDs (OLEDs). In various embodiments, a lighting module may include multiple types of LEDs. For example, a lighting module may include a first type LEDs that are configured to selectably emit white light of various color temperatures, along with a second type of LEDs that are configured to selectably emit light of various colors.

The LEDs of the LED light source of a lighting module may be arranged in one or more rows, matrices, or other arrangements with corresponding components supported in place and/or spaced apart by supports. For example, the LEDs may form matrices of n×n LEDs, such as 4×4 or 8×8 matrices. Alternatively, the LEDs may be positioned in curved rows so that when all modules are positioned within an opening of the illumination device 100, the illumination device 100 comprises concentric rings of LEDs. The arrangement of LEDs for the purpose of power supply and control may or may not conform to the arrangement of the LEDs in rings, clusters, matrices or other groupings.

Each lighting module 101a-n may also include a supporting structure such as a substrate (not shown here) configured to hold the LEDs of the LED light source 102a-n. For example, the substrate may be made of any support material (such as fiberglass, ceramic, silicon, or aluminum) with conductive elements (such as traces, bars or wires) placed thereon or therein to direct power, control signal, or the like to the LEDs of the LED light source. The conductive elements may be copper, silver or another conductive material and applied as conductive ink, wire, traces, or other materials to provide a conductive pathway. Optionally, the substrate may include a portion that is a circuit board. Driver circuitry on the circuit board may deliver current to the LEDs via one or more conductive elements on the substrate, such as conductive lines, traces, bars or wires positioned on the substrate. In certain embodiments, various conductors and/or electronic devices may also be mounted on the substrate. For example, a set of module-level conductors may be connected to the lighting module's power source and ground. Each module-level conductor may be connected to one of the conductive elements on the substrate 110.

The optical assembly 102a-n of each LED module 101a-n may be configured to protect the substrate and LEDs of the lighting module from the ambient elements, as well as to collect, focus and/or direct light emitted by the LEDs. The optical assembly 102a-n may include a reflector, a refractor, a lens, and/or other components selected to provide desirable properties such as, without limitation, preventing off-angle glare, desired optical properties (e.g., total internal reflection, collimate light within the lighting module 101a-n), resistance to impact damage, and/or resistance to degradation from UV, heat and environmental extremes.

Figure 2A:
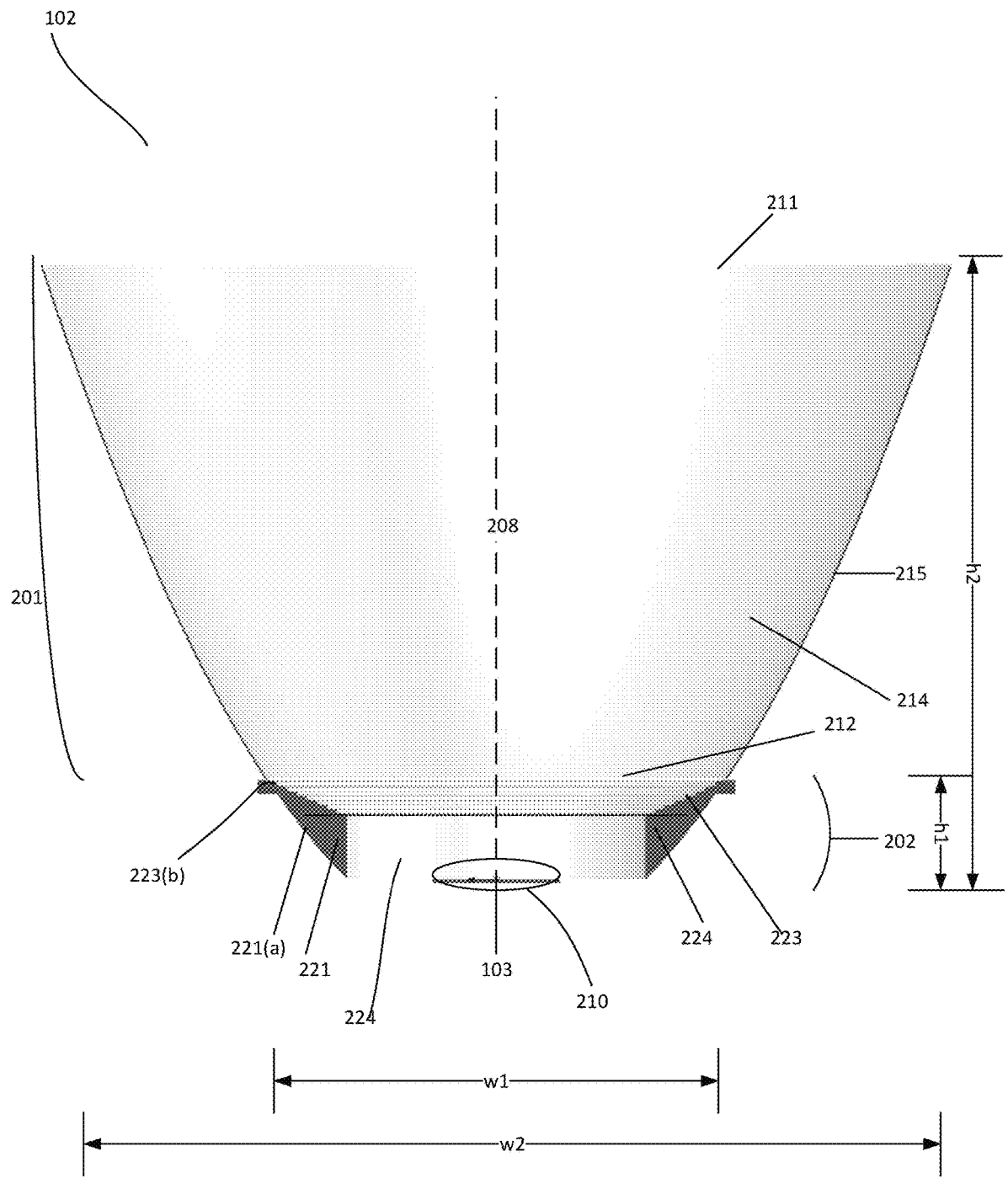
FIG. 2A is a schematic diagram illustrating an example optical assembly included in the illumination device of FIG. 1.

FIG. 2A is a schematic drawing illustrating an example optical assembly 102 included in a lighting module 101a-n. As shown in FIG. 2A, the optical assembly 102 may be parabolic in shape, and the receiving orifice 210 (positioned over and/or in proximity of an LED light source 103) of the parabolic shape may be generally located proximate to the focus of the parabolic shape. The standoff and slope of a parabolic shape optical assembly may vary depending on the desired beam angle, beam shape, beam spread or other beam properties to be achieved by the lighting module. Other optical assembly shapes such as, circular, rectangular, or the like, are within the scope of this disclosure.

In one or more embodiments, the optical assembly 102 may include an upper reflector 201 fitted over a lower refractor 202, that together form the optical assembly 102. In case of a parabolic shaped optical assembly, the upper reflector 201 is fitted on top of the lower refractor 202 that forms the focus of the parabolic shape.

Figure 3A:
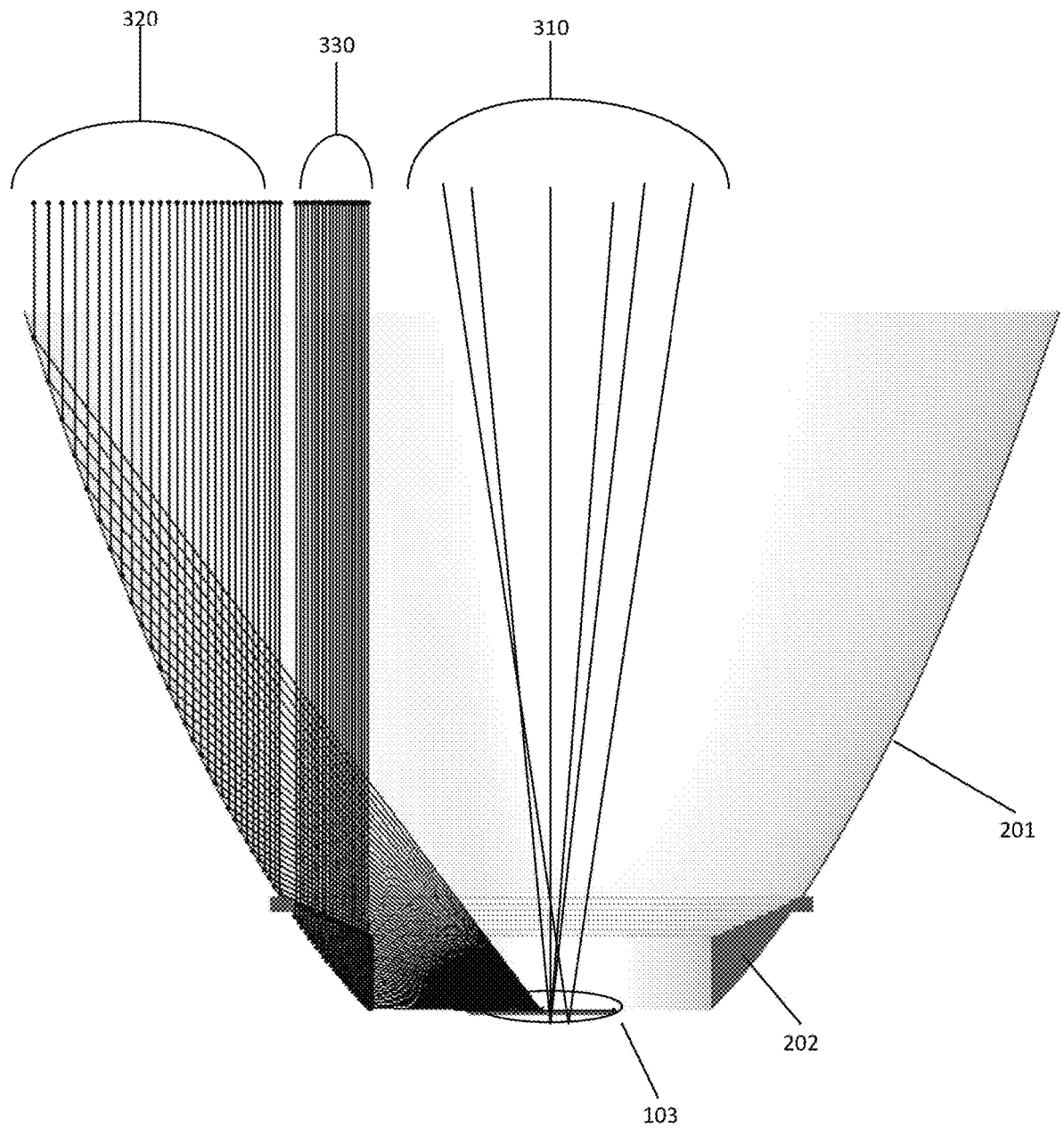
FIG. 3A is a schematic diagram illustrating a transparent cross-sectional view of the example optical assembly of FIGS. 2A and 2B including light paths through the optical assembly.

The upper reflector 201 may include a hollow body 214 with a reflective inner surface 215 such that light incident on the reflective inner surface 215 may be reflected away from the light source 102 in a desired direction and/or light pattern. For example, in an example embodiment, light incident on the reflective inner surface 215 may be reflected in a direction parallel to the axis of symmetry 208 of the parabolic shape optical assembly 102 to form a collimated light output as shown in FIG. 2A. Light reflected by the reflective inner surface 215 may exit the optical assembly 102 via an upper opening 211 of the upper reflector 201. In certain embodiments, the upper opening 211 may be open to the environment of the illumination device. Alternatively and/or additionally, the upper opening 211 may be configured to interface with other components of the optical assembly such as a module-level cover and/or components of the illumination device 100 such as a device-level cover (not shown here), other lighting modules, or the like. The reflective inner surface 215 may be oriented to receive light rays (line of sight) from the LED light source 103. While FIG. 3A illustrates that the light rays exit the upper opening 211 in a collimated pattern, the disclosure is not so limiting, and the output pattern of light may vary depending upon, for example, the shape, dimensions, type, etc. of the upper reflector 201.

The upper reflector 201 may also include a lower opening 212 configured to interface with the lower refractor 202. For example, the hollow body 214 portion surrounding the lower opening 212 may be stuck onto the upper portion 221 of the lower refractor 202, fit into a groove and/or engage with a lip (not shown here) provided on the outside edge 223(b) of the upper portion 223 of the lower refractor 202, or the like The upper reflector 201 may be made from materials such as polycarbonate, acrylic, plastic, aluminum or other metallic material, with a reflective coating chrome) or polished reflective surface. In some example embodiments, the upper reflector 201 may be manufactured using an injection molding process followed by application of a reflective coating.

Figure 2B:
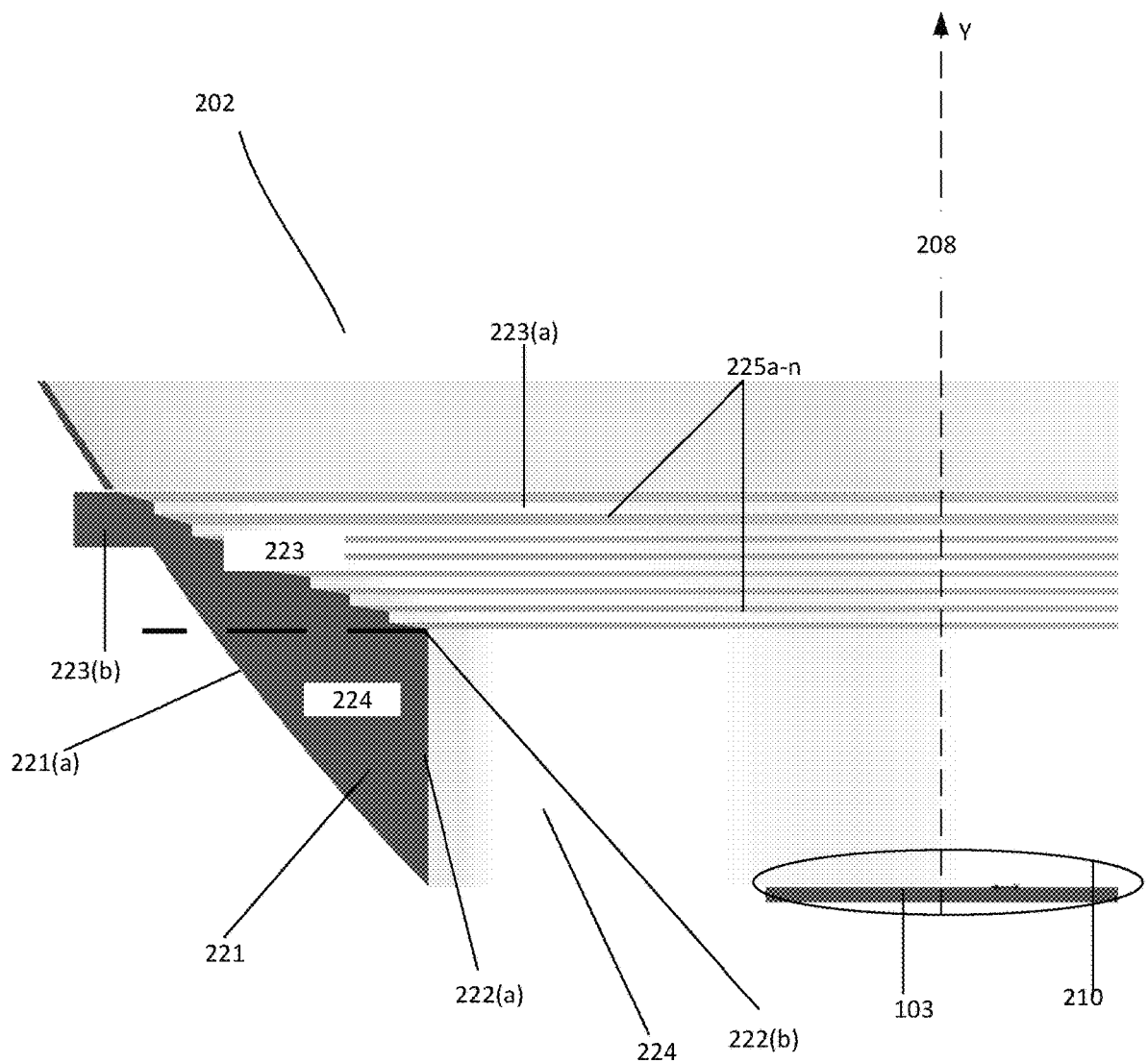
FIG. 2B is a schematic diagram illustrating a close up view of a portion of a refractor component of the optical assembly of FIG. 2A.

FIG. 2B is a schematic diagram illustrating a close up view of a portion of the lower refractor 202. The lower refractor 202 may be made from a material that is resistant to damage from high temperatures generated near the LED light source 103 (and/or heat sink), and is geometrically adapted to achieve total internal reflection (FIR) when used with an LEI) light source 103.

As shown in FIG. 2A and FIG. 2B, the lower refractor 202 may include a solid one-piece body 221 that has an outer surface 221(a) shaped to form the lower part of the optical assembly 102. Specifically, the outer surface 221(a) forms a desired optical assembly shape (e.g., parabolic) with the upper reflector 201. The outer surface 221(a) may be polished to provide total internal reflection for the light rays incident upon the outer surface. It will be understood to those of skill in the art that while FIGS. 2A and 2B illustrate a parabolic shaped optical assembly, the disclosure is not so limiting, and other shapes are within the scope of this disclosure with the upper reflector 201 forming the upper part of the desired optical assembly shape and the lower refractor 202 forming the lower part f the desired optical assembly shape.

The body 221 may include a lower portion 224 having a smooth inner surface 222(a) configured to form a channel 224 (e.g., cylindrical channel) around the receiving orifice 210 of the optical assembly 102. In case of a parabolic-shaped optical assembly, the channel 224 may be centrally aligned with the axis of symmetry 208 of the parabolic-shape optical assembly. In certain embodiments, the channel 224 may be configured to collect and/or collimate light in the center region of the parabolic-shaped optical assembly 102 and may include material that has a refractive index that is different from that of the material of the body of the lower refractor 202. For example, the channel 224 may include air or other medium that does not cause distortion and/or loss of light rays received from the LED light source.

The body 221 may also include a truncated conical upper portion 223 that tapers up from the top 222(b) of the inner surface 222(a) to the outside surface 221(a) where it may, form an outside edge 223(b) for interfacing with the upper reflector 201. The upper surface 223(a) of upper portion 223 may include a plurality of corrugations or facets 225a-n, extending from the 222(b) of the inner surface 222(a) to the outside surface 221(a), and stacked in the height direction (i.e., Y-direction). The corrugations 225a-n are configured to allow for direct sight from the light source 103 to the base of the upper reflector 201 to allow for total internal reflection (TIR) from the complete optical assembly 102 (as described below).

Each corrugation 225a-n may be shaped as a step having two planar faces (a vertical face and an incline face) disposed at an angle with respect to each other. The dimensions of the planar faces, shapes of the planar faces, and/or the angles between the planar faces may be identical for each corrugation, and/or may differ for at least some of the corrugations 225a-n depending upon, for example, the shape of the optical assembly 102, the desired output light pattern or distribution, or the like. In certain embodiments, the angle between each vertical face and the incline face may be determined based upon the desired output light pattern or distribution. Specifically, the corrugations 225a-n may be configures to compensate for the difference in refractive index of the body 221 and the medium surrounding the LED light source (e.g., air) for obtaining the desired output light pattern or distribution. For example, a collimated output light pattern or distribution parallel to the axis of symmetry 208 (as shown in FIG. 3A) by forming the corrugations 225a-n to have an angle between the two planar faces (Le incline of the incline faces) that is designed so that a light ray entering the lower refractor 202 exits an incline face of one of the corrugations 225a-n parallel to the axis of symmetry 208 (as discussed below) and may depend on the refractive index of the material of the lower refractor 202 (for example and angle of about 80° to about 100°, an angle of about 85° to about 95°, or an angle of about 90°). Furthermore, the incline faces may be parallel to each other, and/or the vertical faces may be parallel to each other and to the axis of symmetry 208.

The lower refractor 202 may be formed using, for example, silicone, optical silicone or other thermally suitable material. The optical silicone may be, for example, a methyl silicone, a vinyl-methyl silicone, a phenyl-vinyl methyl silicone and a fluorine-vinyl-methyl silicone and/or their blends and/or their derivatives.

In one or more embodiments, the height (h1) of the lower refractor 202 is about ⅕ to about ½, about ¼ to about ⅛, and/or about ⅙ of the total height (h2) of the optical assembly 102. In one or more embodiments, the width (w1) of the lower refractor 202 is about 1/2.5 to about 1/3.5, about 1/2.25 to about 1/3.75, and/or about ½ of the total width (w2) of the optical assembly 102.

Referring now to FIG. 3A, a transparent side elevation view of the example optical assembly of FIG. 2 illustrates light paths through the optical assembly. Since the LED light source may be any known LED light source(s), it is not depicted in the figures other than being indicated as located as the source of the light rays 310, 320, and 320 located within the orifice 210. As shown in FIG. 3A, the light rays emitted by the light source may include a segment 310 of rays that are non-reflected or non-refracted direct rays that are collimated and parallel to the axis of symmetry 208 of the optical assembly 102. The light rays may also include a segment 320 of rays that are incident upon the upper reflector 201 to be reflected in a desired light distribution or pattern (e.g., collimated and reflected in a direction parallel to the axis of symmetry 208). Finally, the light rays include a segment 330 of rays that are received into the lower refractor 202 and exit incline faces of the corrugations 225a-n in a desired light distribution or pattern (e.g., parallel to the axis of symmetry 208 in a collimated manner).

It will be appreciated that the height of the cylindrical channel 224, the size, shape, and/or angle of the corrugations 225a-n, and/or the distance between the top 222(b) of the inner surface 222(*a*) and the outer edge 223(*b*) (i.e., length of the upper surface 223(*a*)) may be designed such that light rays are never directly incident upon the corrugations 225*a-n*. In other words, the light source 103 has direct line of sight to the base of the upper reflector 201 as shown in FIG. 3C. Specifically, light rays in segment 334) always enter the lower refractor 202 via the inner surface 222(*a*) and exit the lower refractor 202 via the upper surface 223(*a*). Therefore, light rays from the light source exit the optical assembly 102 directly (segment 310), after being reflected by the upper reflector 201 (segment 320), or after being incident upon the inner surface 222(*a*) of the lower refractor 202 (segment 330—described in FIG. 3B).

Figure 3B:
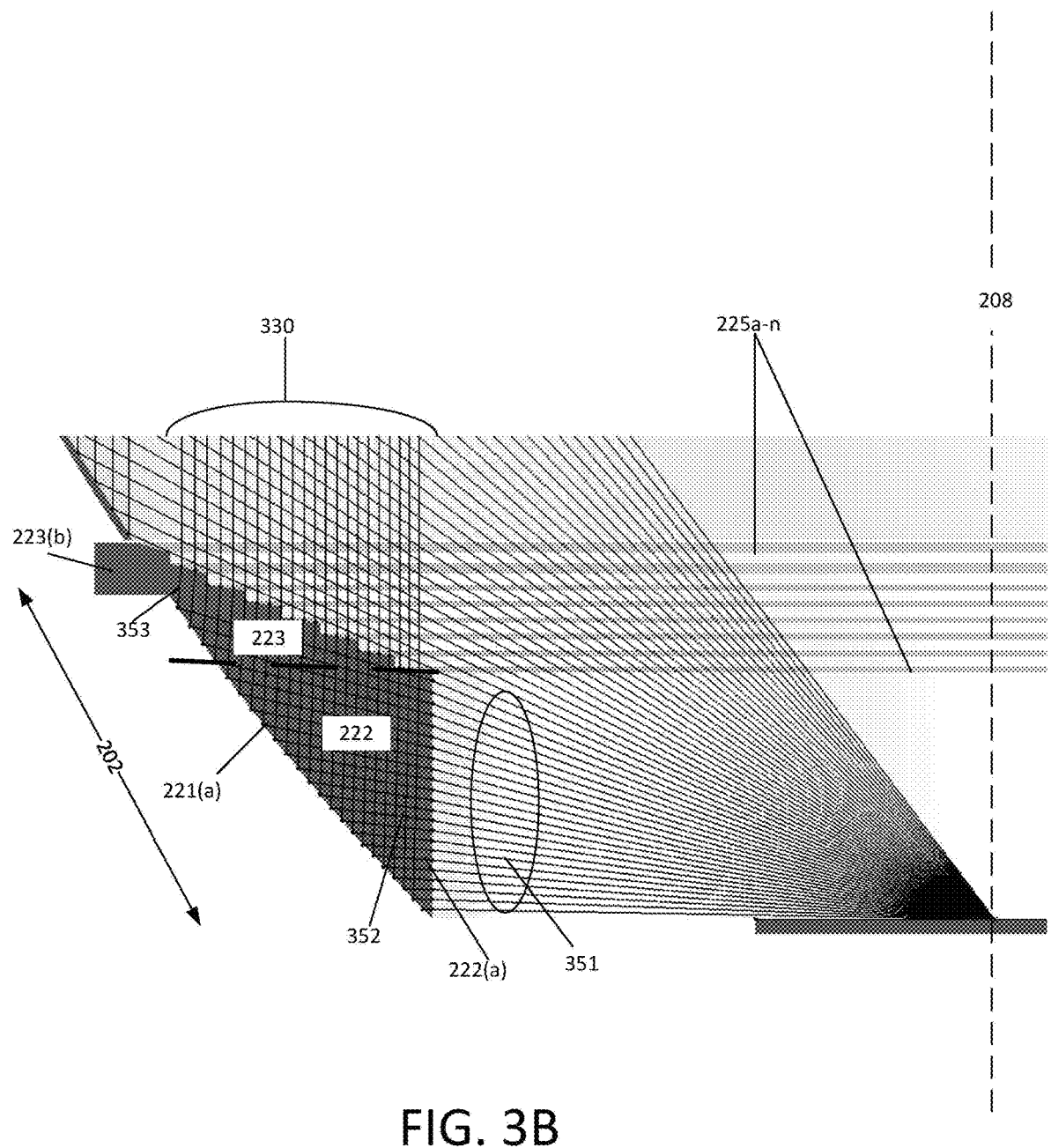
FIG. 3B illustrates example light paths in the refractor component of the optical assembly of FIGS. 2A and 2B.
Figure 3C:
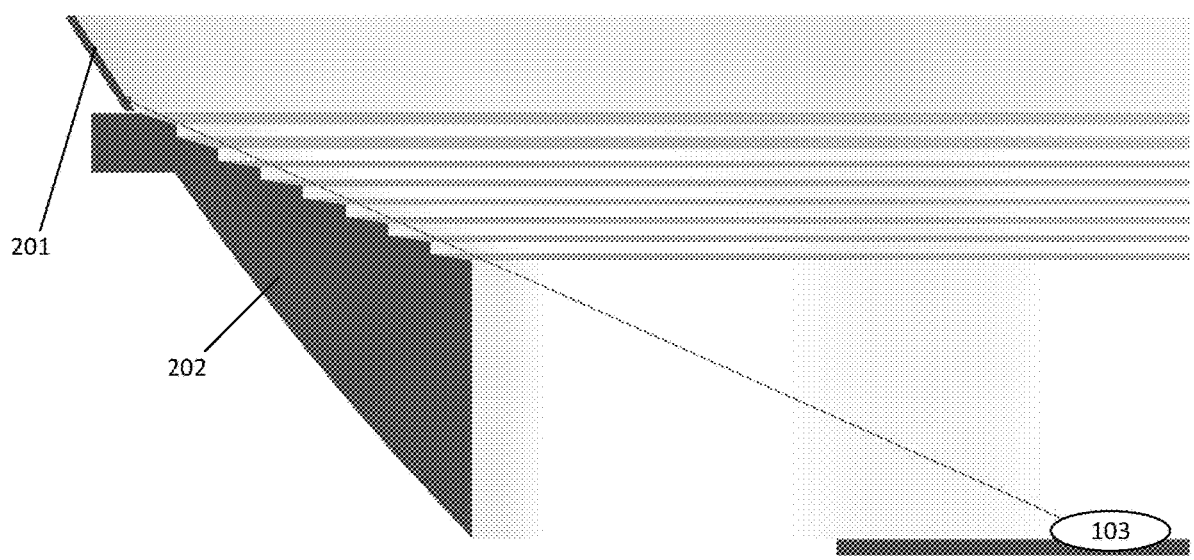
FIG. 3C illustrates example light paths in the refractor component of the optical assembly of FIGS. 2A and 2B.

FIG. 3B illustrates an enlarged view of example paths traversed by light rays in segment 330. As shown in FIG. 3B, light rays 351 incident upon the inner surface 222(*a*) of the lower portion 222 are refracted because of the change in refractive index at the inner surface 222(*a*). As a result of refraction, the light rays may bend away from the normal (i.e., the axis of symmetry 208) before traveling within the lower refractor 202. The bent light rays 352 may travel within the lower refractor 202 and may be reflected after striking the outer surface 221(*a*) of the lower refractor 202. The reflected rays 353 may finally exit the lower refractor 202 via an incline face of one of the corrugations 225*a-n*. Since the refractive index changes as the rays 353 exit the lower refractor 202 via an incline face of one of the corrugations 225*a-n*, the rays 353 undergo refraction again and are bent upon exit with respect to the normal. The angle of inclination f the incline faces of the corrugations 225*a-n* with respect to the vertical faces may be configured such that the light rays iii segment 230 are parallel to the axis of symmetry 208. Specifically, the incline may be configured to compensate for the reflection angle at outer surface 221(*a*), and the refraction angles at the inner surface 222(*a*) and the inclines of the corrugations 225*a-n*.

It will be understood to those of skill in the art that while FIGS. 3A, 3B, and 3C illustrate a collimated light distribution pattern, the disclosure is not to limiting. The output light distribution may not be collimated and may include any desired pattern depending upon, for example, the shape and dimensions of the upper reflector 201, the shape and dimensions of the lower refractor 202, and/or the shape (i.e., relative angles of planar faces) and dimensions of the corrugations 225*a-n* of the lower refractor 202. The optical assembly 102 of the current disclosure is configured to provide TIR using an upper reflector and a thermally stable lower refractor.

It should be noted that the optical assembly 102 of the current disclosure is resistant to damage from high temperatures near the LED light source and/or heat sink because it includes a lower refractor made of heat stable material (e.g., silicone), and which also provides the desired output distribution or pattern of light rays from the light source by including specific geometrical features in the lower refractor. The combination reflector refractor optical assembly 102 is designed to create a thermal barrier between the hottest parts of a lighting module (e.g., near the LED light source) and the metalized reflector components.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:

1. A lighting module comprising:
a light emitting diode (LED) light source; and
a total internal reflection (TIR) optical assembly comprising:
a refractor configured to be located proximate to the LED light source wherein the refractor includes an upper surface that comprises a plurality of corrugations, and
a reflector configured to be attached to the refractor, wherein a lower surface of the reflector is adjacent at least a portion of the upper surface of the refractor and wherein the refractor is made from a material that is different than the reflector and provides at least a partial thermal barrier between the reflector and the LED light source.

2. The lighting module of claim 1, wherein:
the reflector comprises a hollow body configured to form an upper part of the TIR optical assembly that is not proximate to the LED light source; and
an inner surface of the hollow body is configured to substantially reflect light rays received from the LED light source in a light distribution pattern away from the LED light source.

3. The lighting module of claim 1, wherein the refractor comprises a solid body that forms a lower part of the TIR optical assembly.

4. The lighting module of claim 1, wherein:
the TIR optical assembly has a parabolic shape configured to provide an output light distribution pattern that is collimated and in a direction parallel to an axis of symmetry of the parabolic shape; and
the LED light source is located proximate to the focus of the parabolic shape.

5. The lighting module of claim 1, wherein the material is silicone.

6. The lighting module of claim 1, wherein the reflector is formed from a metallic material.

7. The lighting module of claim 1, wherein the light emitted by the LED light source is substantially collimated.

8. The lighting module of claim 1, wherein the plurality of corrugations are configured to provide a direct line of sight from the LEI) light source to the reflector.

9. A lighting module comprising:
a light emitting diode (LED) light source; and
a total internal reflection (TIR) optical assembly comprising:
a refractor configured to be located proximate to the LEI) light source, and
a reflector configured to be attached to the refractor, wherein the refractor is made from a material that is resistant to thermal damage when exposed to heat generated by the LED light source,
wherein the refractor comprises a solid body that forms a lower part of the TIR optical assembly and, wherein the refractor further comprises an inner surface that defines a cylindrical channel extending longitudinally through the refractor, the cylindrical channel configured to be positioned over the LED light source.

10. The lighting module of claim 9, wherein
each corrugation of the plurality of corrugations comprising two planar faces positioned at an angle with respect to each other.

11. The lighting module of claim 10, wherein the angle is configured to provide TIR of light rays incident on the inner surface of the refractor.

12. The lighting module of claim 11, wherein a light ray received by the refractor, from the LED light source, traverses a path within the solid body of the refractor and exits the refractor via one of the plurality of corrugations in the upper surface in a light distribution pattern away from the LED light source.

13. The lighting module of claim 12, wherein:
the light ray received by the refractor enters the solid body of the refractor via the inner surface and forms a refracted light ray; and
the refracted light ray is reflected by an outer surface of the refractor before exiting the refractor, the outer surface polished to provide reflection of incident light rays.

14. The lighting module of claim 10, wherein the plurality of corrugations are designed to provide a direct line of sight from the LED light source to the reflector.

15. The lighting module of claim 10, wherein the inner surface of the refractor is shorter than an outer surface of the refractor.

16. An optical assembly fora lighting module, the optical assembly comprising:
a refractor configured to be located proximate to an LED light source, wherein the refractor includes an upper surface that comprises a plurality of corrugations; and
a reflector configured to be attached to the refractor such that a lower surface of the reflector is adjacent at least a portion of the upper surface of the refractor, wherein:
the refractor is made from a material that is different than the material of the reflector,
wherein the plurality of corrugations are configured to provide a direct line of sight from the LED light source to the lower surface of the reflector, and
the optical assembly provides total internal reflection (TIR) of light rays emitted by the LED light source.

17. The optical assembly of claim 16, wherein:
the reflector comprises a hollow body configured to form an upper part of the optical assembly that is not proximate to the LED light source; and
an inner surface of the hollow body is configured to substantially reflect light rays received from the LED light source in a light distribution pattern away from the LED light source.

18. The optical assembly of claim 16, wherein the refractor comprises a solid body that forms a lower part of the optical assembly.

19. The optical assembly of claim 18; wherein the refractor further comprises an inner surface that defines a cylindrical channel extending longitudinally through the refractor, the cylindrical channel configured to be positioned over the LED light source.

20. The optical assembly of claim 18, wherein a light ray received by the refractor, from the LED light source, traverses a path within the solid body of the refractor and exits the refractor via one of the plurality of corrugations in a desired light distribution pattern and away from the LED light source.

21. The optical assembly of claim 20, wherein:
the light ray received by the refractor enters the solid body of the refractor via an inner surface and forms a refracted light ray; and
the refracted light ray is reflected by an outer surface of the refractor before exiting the refractor, the outer surface polished to provide reflection of incident light rays.

22. The optical assembly of claim 16, wherein:
each corrugation of the plurality of corrugations comprising two planar faces positioned at an angle with respect to each other.

23. The optical assembly of claim 22, wherein the angle is configured to provide total internal reflection (TIR) of light rays incident on an inner surface of the refractor.

24. The optical assembly of claim 16, wherein:
the refractor and reflector form a parabolic shape optical assembly configured to provide an output light distribution pattern that is collimated and in a direction parallel to an axis of symmetry of the parabolic shape; and
the LED light source is located proximate to the focus of the parabolic shape.

25. The optical assembly of claim 16, wherein the material is silicone.

* * * * *